United States Patent [19]
Stragnola

[11] Patent Number: 6,042,250
[45] Date of Patent: Mar. 28, 2000

[54] HORTICULTURE LIGHTING SYSTEM FOR PROVIDING UNIFORM ILLUMINATION FROM AN ELEVATED HEIGHT

[76] Inventor: Steven Vincent Stragnola, 23 Dutch Valley La., San Anselmo, Calif. 94960

[21] Appl. No.: 09/128,040

[22] Filed: Aug. 3, 1998

[51] Int. Cl.[7] .................................................. F21V 7/14
[52] U.S. Cl. ......................... 362/297; 362/285; 362/346; 362/805
[58] Field of Search ................................ 362/1, 297, 304, 362/346, 348, 805, 285, 287, 372, 241, 247, 249, 250, 238, 239

[56] References Cited

U.S. PATENT DOCUMENTS

| | | | |
|---|---|---|---|
| 2,492,946 | 1/1950 | Barber | 362/348 |
| 3,701,898 | 10/1972 | McNamara, Jr. | 362/346 |
| 3,838,632 | 10/1974 | Federico | 240/44.1 |
| 4,065,667 | 12/1977 | Ruud et al. | 362/297 |
| 4,164,012 | 8/1979 | Gulliksen | 362/282 |
| 4,187,531 | 2/1980 | Lowell et al. | 362/17 |
| 4,207,607 | 6/1980 | Gulliksen | 362/282 |
| 4,308,573 | 12/1981 | McNamara, Jr. | 362/297 |
| 4,338,655 | 7/1982 | Gulliksen et al. | 362/218 |
| 4,422,134 | 12/1983 | Brass | 362/346 |
| 4,538,215 | 8/1985 | De Marsh | 362/282 |
| 4,575,788 | 3/1986 | Lewin | 362/346 |
| 5,065,294 | 11/1991 | Poot, Jr. | 362/346 |
| 5,816,694 | 10/1998 | Ideker et al. | 362/348 |

*Primary Examiner*—Alan Cariaso
*Attorney, Agent, or Firm*—Leland K. Jordan

[57] ABSTRACT

A horticulture lighting system reflector hood having a plurality of reflective flutes formed at the intersections of essentially identical side panels and corner panels to reflect radiation emitted from the focal point of the reflector hood downwardly in a way that provides a highly uniform pattern of radiation. Light sources within the reflector hood may be easily changed between several different types of commercially available bulbs without sacrificing the uniformity or desired level of illumination of the exposed plant area.

13 Claims, 10 Drawing Sheets

HORTICULTURE LIGHTING SYSTEM FOR PROVIDING UNIFORM ILLUMINATION FROM AN ELEVATED HEIGHT

FIELD OF THE INVENTION

This invention relates to lighting systems for use in horticulture, and, in particular, relates to a lighting reflector and light bulb socket assembly suitable for uniformly lighting a large planted area.

BACKGROUND OF THE INVENTION

Indoor cultivation of fruits, vegetables, flowers and ornamental plants is an increasingly popular method of producing living plants, whether for the horticulturist, hobbyist or professional nursery operator. Lighting conditions including illumination uniformity and proximity of the radiation source to plants associated with such cultivation are known to have important effects on the quality and abundance of plants. Consequently, efforts have been made to provide for the uniform illumination of growing plants in greenhouses or the like. Particular problems are encountered in at least two situations, including: lighting non-uniformities at different distances from a lighting source may cause plants to be exposed to such non-uniformities as the plants grown in height; illumination non-uniform (overlap and/or gap) areas that result from collecting together a plurality of lighting sources having round or oval shaped areas of illumination; loss in lighting efficiencies when different light bulbs having different radiant arc locations, relative to a fixed light bulb mounting socket, are mounted within a lighting system with the radiant arc at other-than the focal point of a lighting system reflector; and, a loss of convenient operating space between the top of plants and the lighting system as plants grow in height.

Lighting reflectors are available typically with a horizontal bulb mounting socket, below which is a flared out a generally uniform frustoconically shaped reflector, optionally having below a further downwardly and outwardly extending portion terminating in an almost cylindrical lip. Such reflectors tend to reflect the light downwardly in a flood angle from about 65 degree(s) to about 75 degree(s) which requires the reflector to be located only a few feet, e.g. 3 to 4 feet, above the plants. As such, the lighting uniformity available from such a reflector is adversely affected when the reflector is adjusted in height to avoid the situation when plants grow into undesirably close proximity the reflector. Inconveniently, lighting reflectors may be adjusted upwards as plants grow in height. Furthermore, cultivation of plants illuminated by such a reflector hood is awkward because of the limited free movement possible by a horticulturists beneath a hood located only a few feet above plants.

In view of the foregoing, it is believed to be advantageous to provide a horticulture lighting system for providing uniform illumination to a plant area without overlapping or non-illuminated areas. Another shortcoming not addressed in the prior art is the inability to accommodate the growing height dimensions needed by large plants as well as operating space needed by horticulturists. A further shortcoming not addressed in the industry is the ability to readily change lighting bulbs from one type to another without sacrificing uniformity or efficiency.

SUMMARY OF THE INVENTION

The present invention is directed at a horticulture lighting system reflector hood having a plurality of reflective flutes formed at the intersections of essentially identical side panels and corner panels to reflect radiation emitted from the focal point of the reflector hood downwardly in a way that provides a highly uniform pattern of radiation. Additionally, a plurality of such octagonal-shaped reflector hoods each suspended over ground provides an improved uniform light distribution over a large plant area without gaps or overlaps between radiation patterns.

Another object of the present invention is to provide a lighting system where the light source and reflector may be easily suspended between six and seven feet above ground so as to accommodate a maximum height of growing plants, as well as to provide an horticulturist with sufficient operating space above the tops of plants as the height of plants increases. It is an even further object of the present invention to provide a uniform lighting system where the light source may be easily changed between several different types of commercially available bulbs without sacrificing the uniformity or desired level of illumination of the exposed plant area.

BRIEF DESCRIPTION OF THE DRAWINGS

The present horticulture lighting system may be more fully understood from the following detailed description taken in connection with the accompanying drawings wherein.

DESCRIPTION OF THE PREFERRED EMBODIMENTS

Exemplary embodiments of the lighting system according to the present invention are presented only with those components of primary interest relative to the inventive apparatus and process. For purposes of clarity, many of the mechanical and electrical elements for attaching and assembling the various components of the lighting system are not illustrated in the drawings. A lighting control panel which provides for the electrical control of a illumination bulb used in the present lighting system is not shown as such bulbs and their operation are well known within the industry. These omitted elements may take on any of a number of known forms which may be readily realized by one of normal skill in the art having knowledge of the information concerning the mode of operation of the system and of the various components and related processes utilized for horticulture lighting systems as provided herein.

As used herein, the term "lighting system" refers to a system capable of creation of a flux of radiation by activation of a lighting bulb. The terms "lighting", "radiation" and "illumination" all refer to electromagnetic energy having a wavelength in the infrared, visible and ultraviolet range. Lighting bulbs for use in the present invention are those having metal halide, high pressure sodium radiation sources and combinations thereof.

Figure 1:
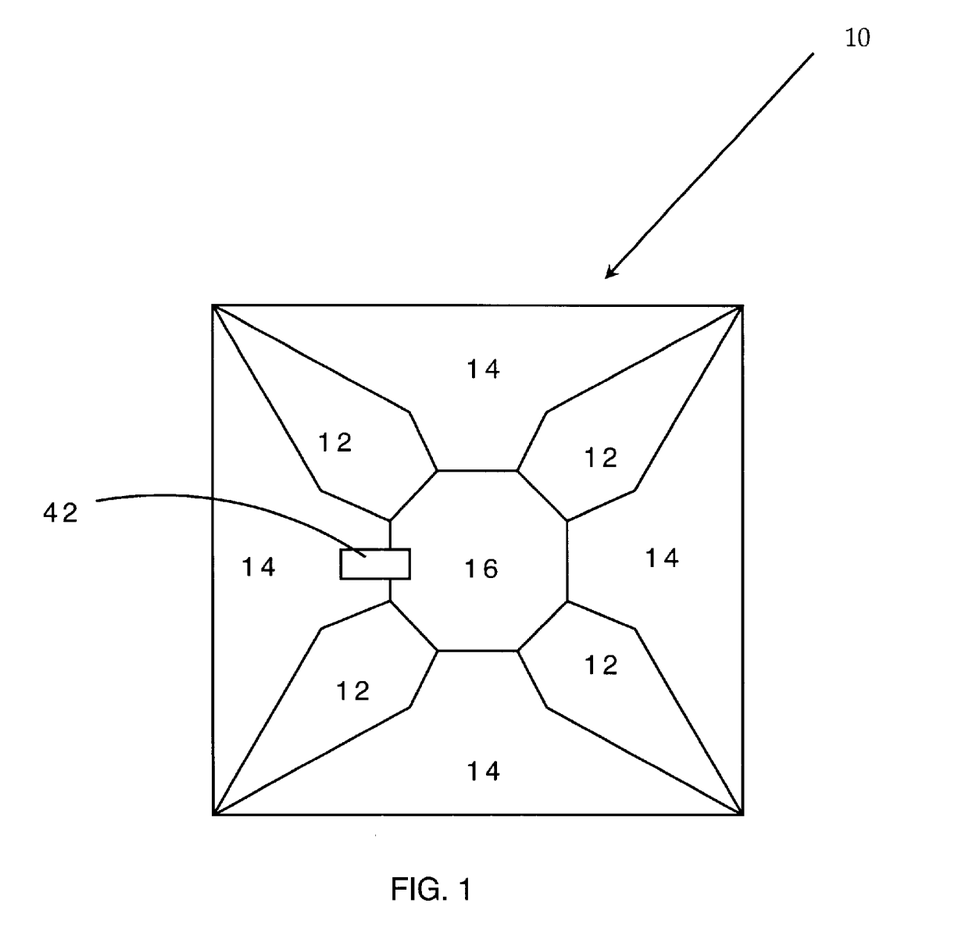
FIG. 1 is a top plan view of a lighting system apparatus having a multisided light reflector and a multiposition bulb mounting socket, both in accordance with the present invention.
Figure 2:
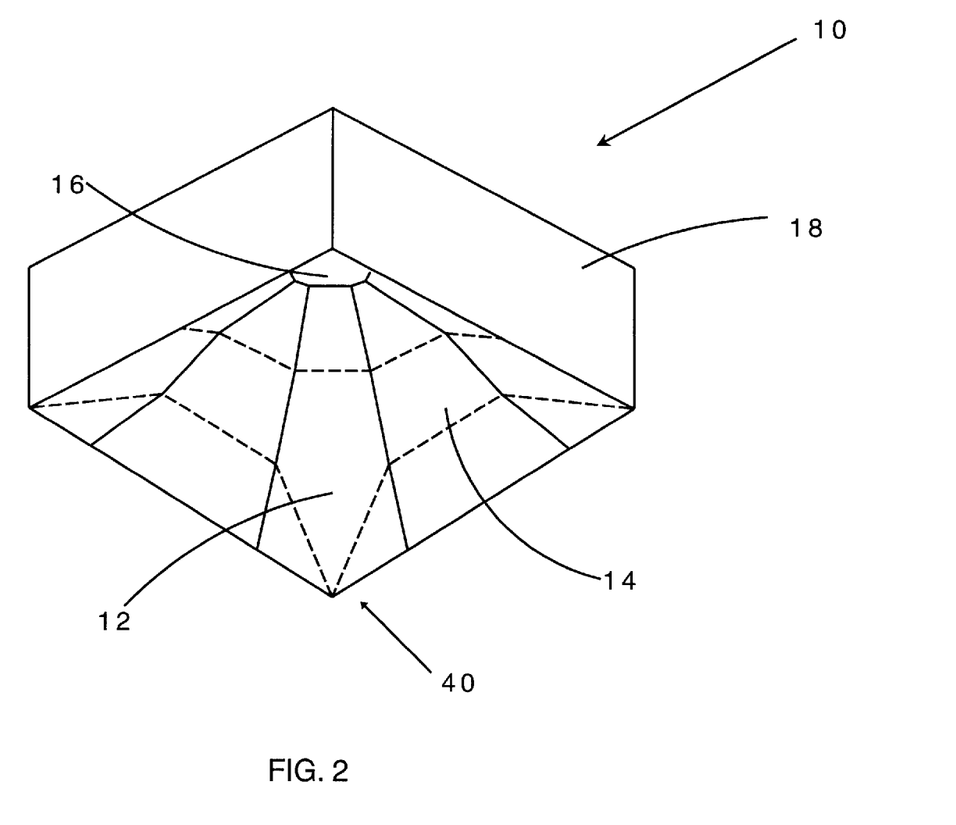
FIG. 2 is a schematic perspective view of the multisided light reflector of FIG. 1.

Referring to the drawings, FIG. 1 illustrates an octagonally shaped reflector hood 10 in accordance with the present invention, the hood 10 comprising four side panels 14 and four identical corner panels 12. Side panels 14 are identical except that one of the side panels 14 has a hole therein to accommodate a bulb socket 42 described hereinafter. Side panels 14 and corner panels 12 are preferably made from a rotationally molded plastic having a flat reflective internal surface comprising downwardly directed bent sections as indicated and extending outwardly from a uppermost central panel 16. Alternate materials of construction include sheet metal or hydraformed plastic sheeting. The overall shape of the reflector hood 10 is rectangularly symmetrical with a plurality of multifaceted flat surfaces formed from the various flat and bent sections of side panels 14, corner panels 12 and central panel 16 in a pattern to give a somewhat pyramid-shaped internal structure as illustrated in FIG. 2. An internal reflective surface finish of specular aluminum is preferably given to each of the panels 12, 14 and 16 using well known painting processes. An optional rectangular box-like shape may be given to the reflector hood 10 by addition of vertical and flat walls 18 around the perimeter of the reflector hood 10, if desired.

In order to describe the relative relations between side panels 14, corner panels 12 and central panel 16, the assembly of these panels into reflector hood 10 is next described. Bends, also described next, in the corner panels 12 and side panels 14 are indicated in dashed lines for purposes of illustration in FIGS. 2, 3, and 4.

Figure 3:
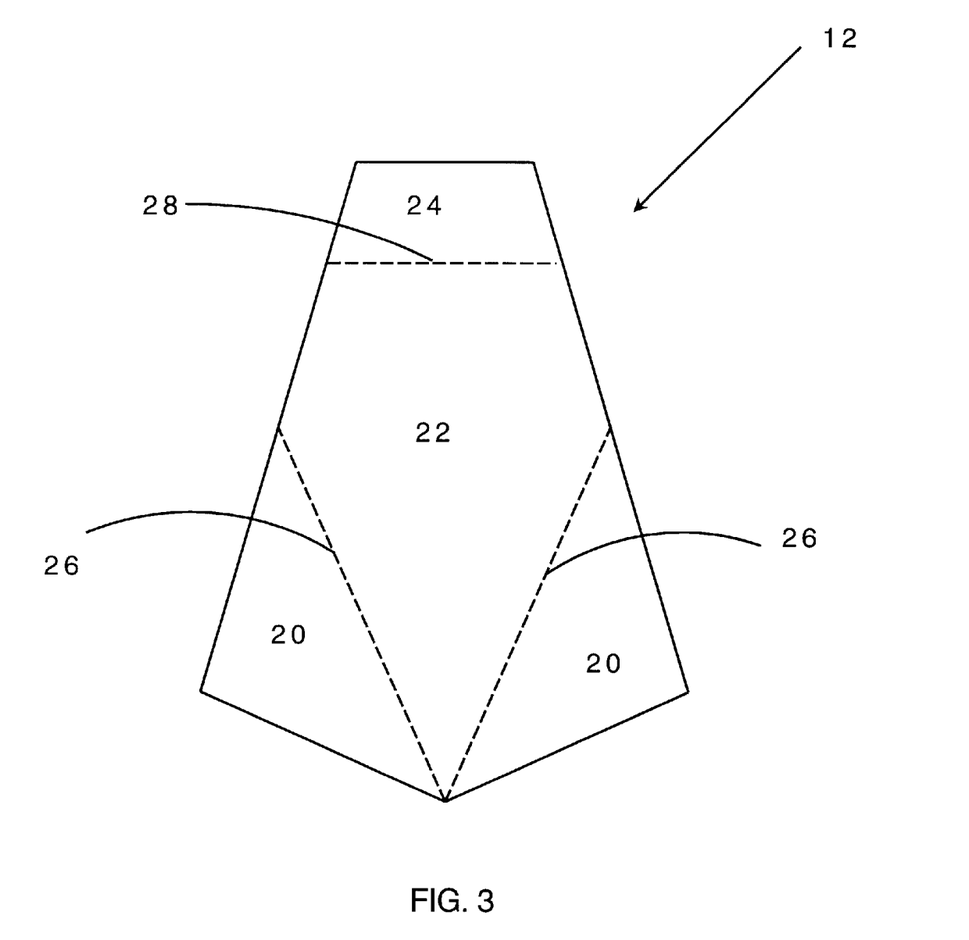
FIG. 3 is a top plan view of a first one of the multisided light reflector portions of the lighting system of FIG. 1.

The lighting system hood 10 is suspended in a manner so that central panel 16 is positioned parallel to the ground, defining a plane also parallel to the ground surface to be illuminated. In assembly, edge flap sections 20 of the corner panel 12 (as seen in FIG. 3) are bent downwards along edge band lines 26 so that the edge flap sections 20 are at an approximate 40° angle below the horizontal plane defined by lower central portion 22 of the corner panel 12. Similarly, the lower central portion 22 of corner panel 12 is bent downwards along bend line 28 so that the lower central portion 22 produces an approximate 60° angle below the horizontal plane defined by the top portion 24 of the corner panel 12. The top portion 24 is attached to the central panel 16 at an approximate 40° angle below the horizontal plane defined by central panel 16.

Figure 4:
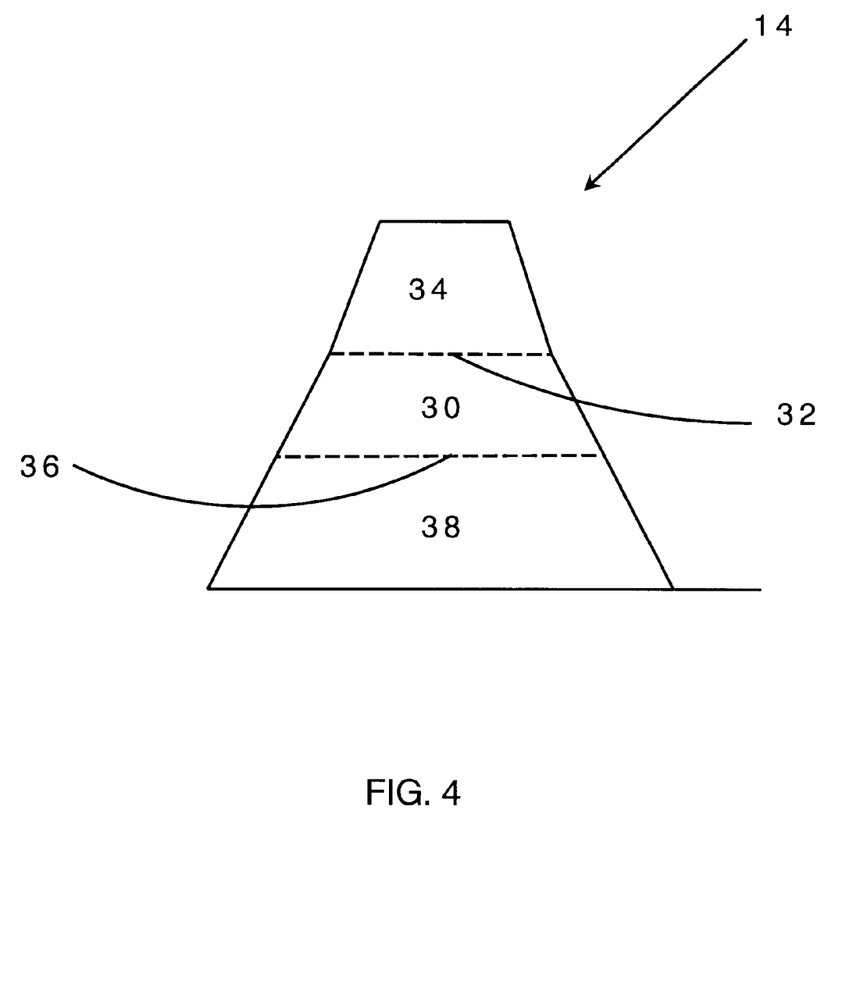
FIG. 4 is a top plan view of a second one of the multisided light reflector portions of the lighting system of FIG. 1.

Continuing in assembly, the middle portion 30 of side panel 14 (as seen in FIG. 4) is bent along a first bend line 32 downwards so that the middle portion 30 of the side panel 14 produces an approximate 20° angle below a horizontal plane defined by an upper central portion 34 of the side panel 14. The upper central portion 34 of side panel 14 is attached to the central panel 16 at an approximate 40° angle below the horizontal plane defined by central panel 16. An additional second bend is made in the middle portion 30 along second bend line 36 so that the lowermost portion 38 of side panel 14 may be attached to edge flap sections 20 of corner panel 12.

Figure 5:
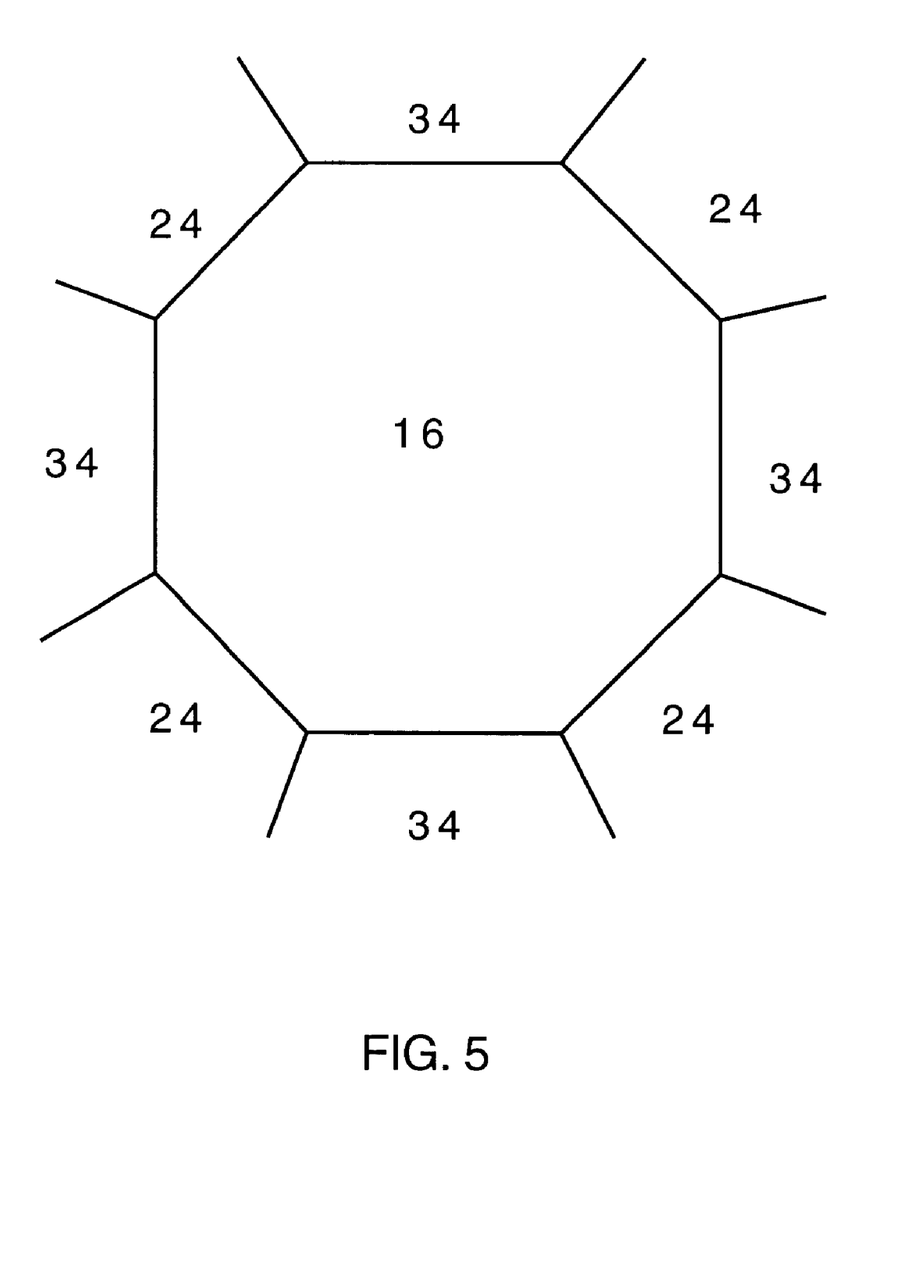
FIG. 5 is a top plan view of a third one of the multisided light reflector portions of the lighting system of FIG. 1 showing relative positioning of the several multisided light reflector portions.

As seen in FIG. 5, in assembly, the upper central portions 34 of four side panels 14 are attached to the central panel 16 along opposed alternating edge sections and the upper central portions 24 of four corner panels 12 are attached to the central panel 16 in the remaining opposed alternating edge sections. As previously described, the upper central portions 34 of four side panels 14 and the upper central portions 24 of four corner panels 12 are attached to the central panel 16 to form a downwardly depending angle of about 40°.

Side panels 14, corner panels 12 and central panel 16 are jointed at their edges using any of several techniques, including welding, threaded metal screws and pop-riveting, pop-riveting being preferred. In an exemplary embodiment of the reflector hood 10, overall dimensions of about 20 inches length×20 inches width×10 inches height have been found to provide a series of advantages described hereinafter. Such exemplary overall dimensions may be produced by providing corner panels 12 with dimension of about 13 inches length×an average of about 6 inches width, side panels 14 with dimension of about 11 inches length×an average of about 6 inches width, and central panel 16 with an average diameter of about 4 inches.

Figure 6:
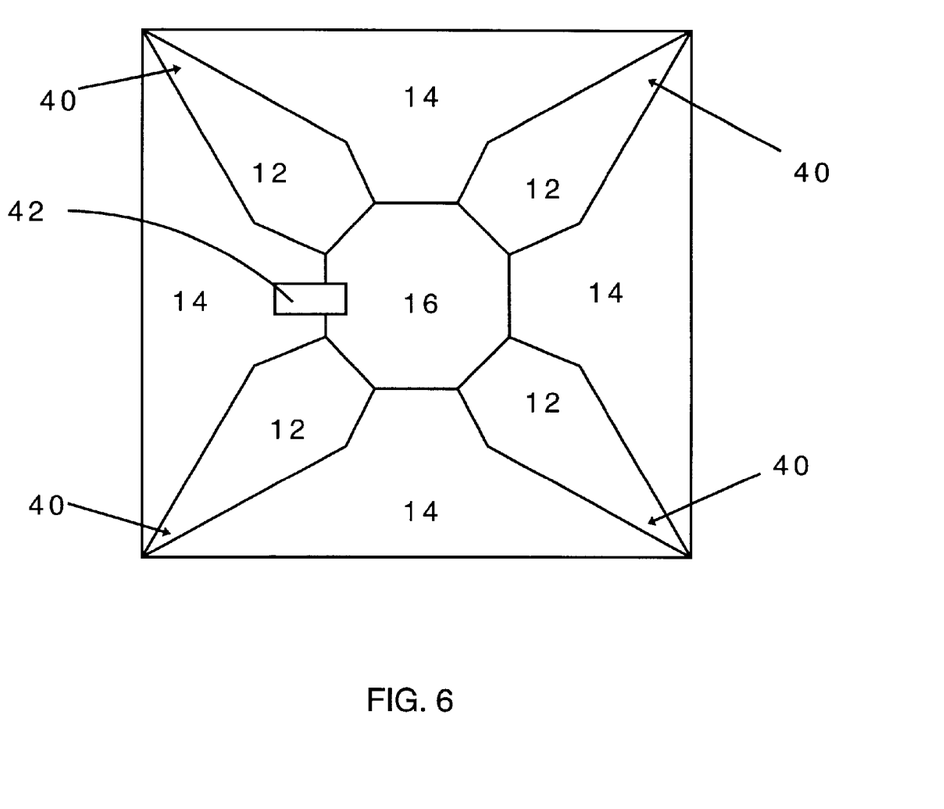
FIG. 6 is a top plan view of a lighting system apparatus showing the location of reflective flutes within the multisided light reflector of FIG. 1 in accordance with the present invention.
Figure 7A:
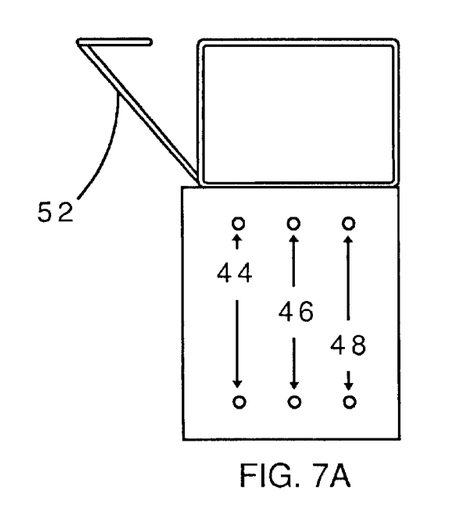
FIGS. 7A, 7B and 7C are side, frontal and bottom views, respectively, showing various components of a multiposition bulb socket housing of FIG. 1.
Figure 7B:
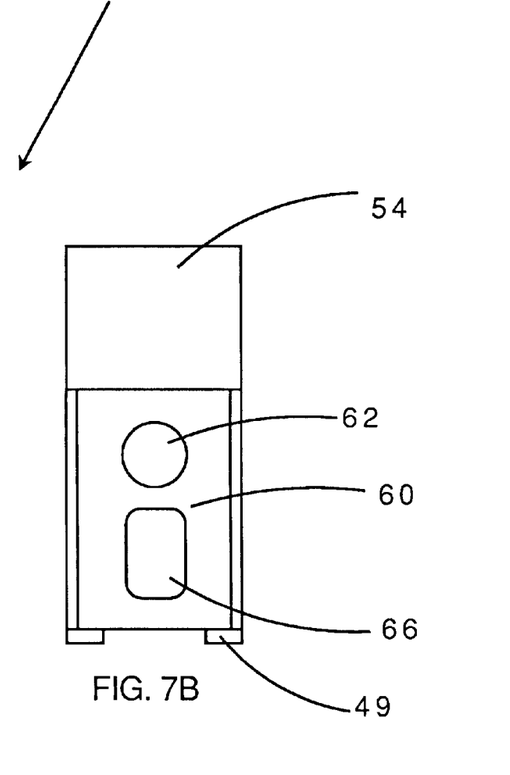
Figure 7C:
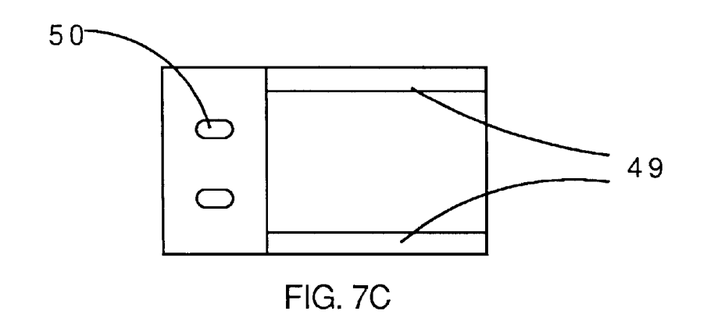

When constructed as described above, an important feature of the reflector hood 10 of the present invention is the four areas of flutes near the lowermost corner edges of the reflector hood 10, generally indicated by the numeral 40 in FIGS. 2 and 6. Because of the angular disposition of the interior reflective surfaces of the side panels 14 and corner panels 12, at the junctions between the lowermost portions 30 of the four side panels 14 and edge flap sections 20 of the four corner panels 12, four corner flutes 40 are formed from the lowermost portions 30 of the four side panels 14 and edge flap sections 20 and lower central portion 22 of the four corner panels 12 at the intersections of side panels 14 and corner panels 12, the flutes 40 reflecting radiation emitted from the focal point of the reflector hood 10 perpendicularly downwardly from the flat plane of the center panel, thereby to convert an otherwise circular or oval beam of radiation, as would be obtained with conventionally designed reflector hoods, into a more uniform square-shaped pattern of radiation. The focal point of the reflector hood is the point at which light radiation converges within the hood when the hood is exposed to a uniform pattern of parallel radiation positioned directly beneath the reflector hood 10. Methods for determining the focal point are well known in the industry, including empirical determination and computer simulation.

In use, multiple light sources are typically employed to obtain illumination of large horticulture growing areas. The introduction of uniform square-like patterns of radiation, as provided by the reflector hood 10 of the present invention provides a means for the horticulturist to mount linear rows and columns of reflector hoods 10 without creating illumination areas having excessive illumination overlap and/or areas without illumination as is the instance with rounded or oval shaped patterns of radiation.

These unique flutes 40 of the reflector hood 10 as described herein creates a radiation flux pattern having a flux density with uniformity not in excess of a 1.5 to 1.0 ratio for the maximum to the minimum value measured within the lighted area over the envelop areas described hereinafter. Further, the four flutes 40 side panels 14 and corner panels 12, in cooperation with a multiposition light socket housing 42, described hereinafter, light bulbs of different energies and different light sources, e. g., metal halide or high pressure sodium, and having their bulb arc located in different relative positions may be easily interchanged within reflector hood 10 so that the bulb arcs may be positioned at the focal point of the reflector hood 10.

Figure 9:
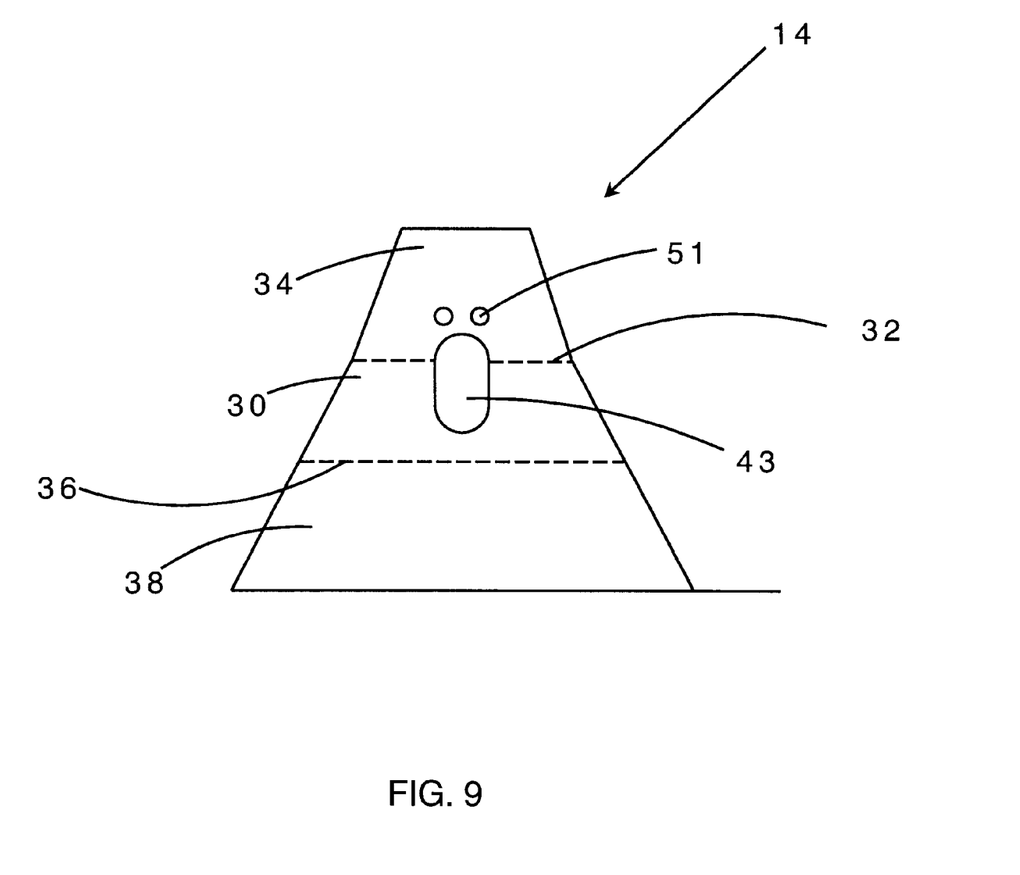
FIG. 9 is a top plan view of the second multisided light reflector portion of FIG. 4 showing a mounting hole for the housing of FIG. 7A; and, FIG. 10 schematic perspective view showing the focal point of the multisided light reflector of FIG. 1 in accordance with the present invention.
Figure 10:
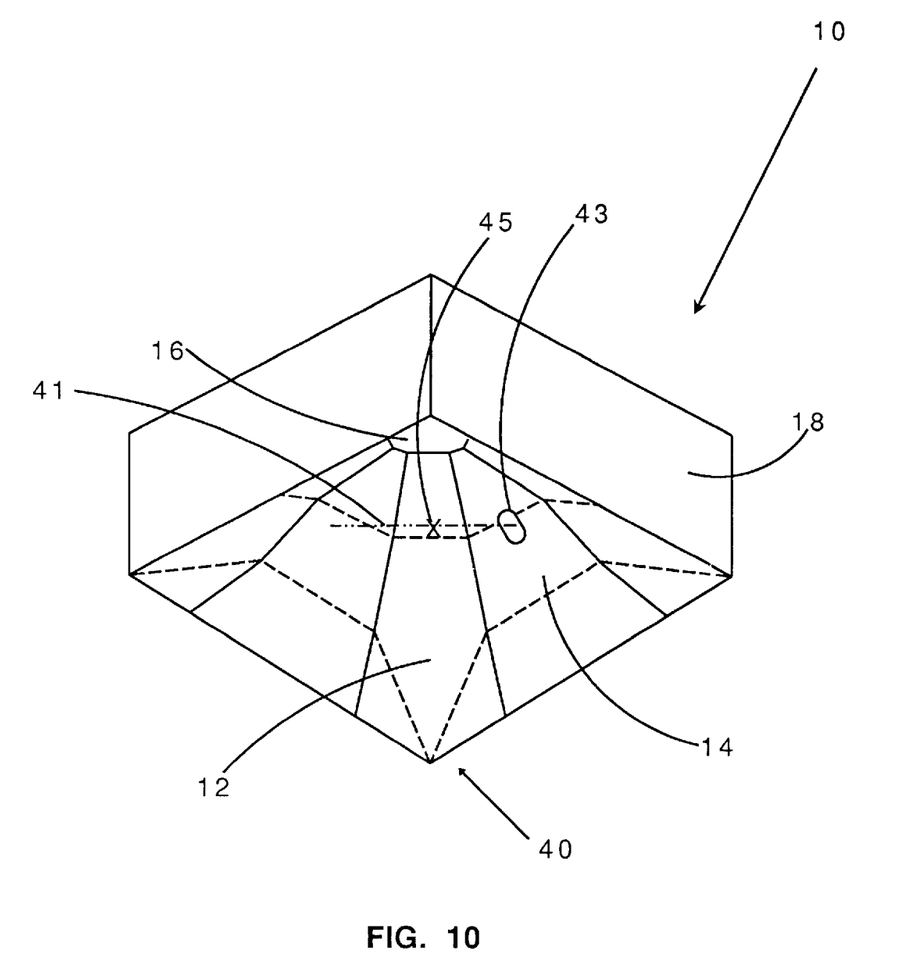

As illustrated in FIG. 1, in conjunction with FIG. 7 through FIG. 10, a light bulb socket housing 42 is mounted onto an opening 43 (FIG. 9) in one of the side panels 14 to support a light bulb (not shown) generally below the bend line 32 so that the socket housing 42 is aligned between side panel portions 30 and 34 in line with the focal centerline 41 of the reflector hood 10, indicated as dash-dot-dot line 41 in FIG. 10. The light bulb socket housing 42 (FIGS. 7A, 7B and 7C) accepts a multiposition socket bracket 60 (seen in FIG. 8) adapted so that light bulbs available from different vendors and having the arc of the light bulb in different positions relative to the bulb's mounting pins may be accommodated in as many as nine different locations in order to position the arc of the individual bulbs at the focal position of the reflector hood 10 located at the central mid-point of focal centerline 41, a point which defines the focal point 45 indicated by the symbol "X" along the focal centerline 41 of the reflector hood 10. By thusly positioning the arc of each tube at the focal point 45 of the reflector hood 10, maximum power output of each tube is delivered onto the illumination envelop by making mounting location adjustments to the bulb socket housing 42 and to the bulb socket bracket 60 as required. An exemplary listing of nine different light bulbs having different arc positions are illustrated in the following Table wherein MOL is defined as:

MOL=Maximum Overall Length between ends of a light bulb and LCL is defined as:

LCL=Lamp Center Length between the mounting end socket of a bulb and the mid-point of a lamp's arc within the bulb.

Figure 8:
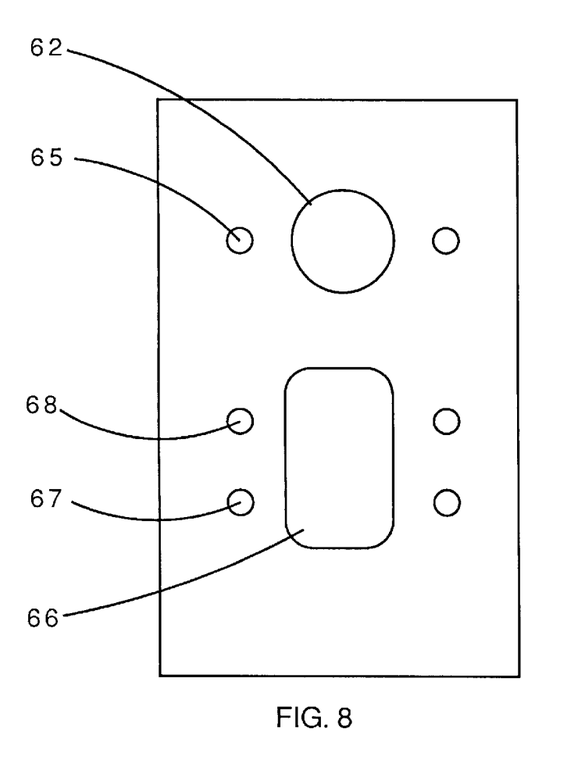
FIGS. 8 and 8A are frontal and side views showing a bracket for attaching a bulb within the bulb socket housing of FIG. 7.
Figure 8A:
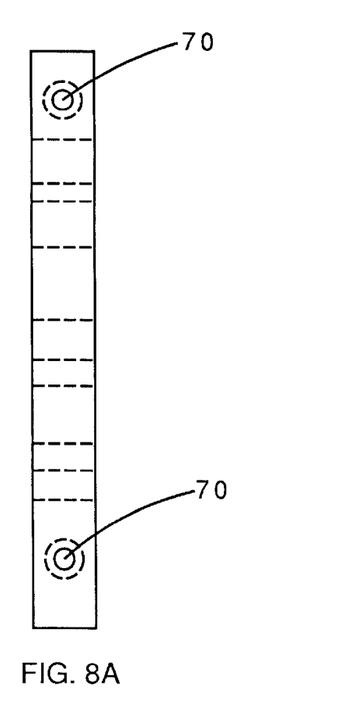

FIG. 8 shows multiposition bulb socket bracket 60 for supporting light bulbs at any of three heights within openings 62 or 66 depending on the geometry of the bulb, using mounting holes 65, or 67 and 68, respectively. Bulb bracket 60 may be slideably positioned along edge rails 49 and within socket bracket housing 42 (FIGS. 7B and 7C) by locating the socket bracket 60 between the three pairs of horizontal bracket mounting holes 44, 46, and 48 (seen in FIG. 7A), using the threaded holes 70 in the side of socket bracket 60, seen in FIG. 8A. The combination of three vertical positionings and three horizontal positionings makes possible the nine multipositions, using any three combinations of mounting holes 44, 46, and 48 and any combination of mounting holes 65, 67 and 68. Socket bracket housing 42 is mounted onto side panel 14 with alignment between openings 43 in side panel 14 (FIG. 10) and openings 62 or 66 in bracket 60 using holes 50 in an angled mounting arm 52 (FIGS. 7A and 7C) of housing 42 in conjunction with holes 51 in side panel 14 (FIG. 9). It is this feature of the multiposition socket housing 42 in combination with the multiposition socket bracket 60 which facilitates an operator's ability to position the mid-point of a lamp's arc within the bulb at the focal point 45 of the reflector hood 10 to achieve maximum lighting efficiency of reflector hood 10, for the range of light bulb types listed in the Table.

Light bulbs suitable for use within the reflector hood 10 include metal halide types rated as having output of 400 and 1000 watts and are available from a variety of vendors including General Electric, N. V. Philips, and Osram Sylvania. High pressure sodium light bulbs are also useful rated as having output of 250, 400, 600 and 1000 watts and are available from the same vendors General Electric, N. V. Philips and Osram Sylvania. Halide/sodium conversion light bulbs rated at 220 and 360 are available from the vendor EYE. Exemplary bulb models are listed in the following Table along with the approximate dimensions of a reflector hood 10 made according to the present invention, the reflector hood 10 being sized in proportion to accommodate the bulb dimensions. In all cases, the bulb is mounted using the 9-multipositional socket bracket 42 to position the arc of the bulb at the focal position for that bulb within the reflector hood 10 so that when the reflector hood is located about 7 feet above ground, the interior reflective surfaces of the side panels 14 and corner panels 12, in cooperation with the four areas of flutes 40 near the lowermost corner edges of the reflector hood 10, create illuminated envelop areas between 36 to 100 square feet in size having a uniform flux density ranging between 467 and 700 foot-candles.

The maximum radiation exposure, about 700 foot-candles, is achieved in the central area of the illuminated envelop and the minimum radiation exposure, about 460 foot-candles, is achieved in the corner area of the illuminated envelop. As used herein, the term "central area" is meant to define the 3 ft×3 ft, 4 ft×4 ft and 5 ft×5 ft centermost portion of the illumination envelop located directly beneath the geometric center of the reflector hood 10, when the reflector hood 10 has square side dimensions of 6 ft, 8 ft and 10 ft, respectively. Thus an illumination uniformity not in excess of a 1.5 to 1.0 ratio for the maximum to the minimum value measured within the lighted area over the illuminated envelop is achieved.

TABLE

Exemplary Bulb Lighting Systems

| Light Bulb Wattage (type) | Light Bulb Source (Vendor/Model) | MOL | LCL | Illumination Envelop at 7 ft hood height |
|---|---|---|---|---|
| 1000 (metal halide) | Venture MS1000/HOR/BT7 | 11.5 | 7 | 10 ft × 10 ft |
| 1000 (high pressure sodium) | General Electric LU 1000 | 15.0625 | 8.75 | 10 ft × 10 ft |
| 600 (high pressure sodium) | Osram Sylvania LU 430 PLANTA | 11.25 | 6.88 | 8 ft × 8 ft |
| 400 (metal halide) | General Electric MVR 400/U | 11.625 | 7 | 6 ft × 6 ft |
| 400 (high pressure sodium) | Philips C400S51 | 9.75 | 5.75 | 6 ft × 6 ft |
| 220 (halide/sodium conversion) | EYE NH220CE | 8.25 | 5.75 | 6 ft × 6 ft |
| 360 (halide/sodium conversion) | EYE NH360CE | 11.5 | 7 | 6 ft × 6 ft |
| 250 (high pressure sodium) | Ostrum Sylvania LU250 | 9.6875 | 5.75 | 6 ft × 6 ft |
| 600 (high pressure sodium) | Ostrum Sylvania LU600SUPER | 11.125 | 6.88 | 8 ft × 8 ft |

While the present invention has been described with respect to what is presently considered to be exemplary embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A horticulture lighting system for providing a uniform field of radiant energy, the system comprising:

a reflector hood having a focal point enclosed by side, corner and center reflective panels attached together to form an octagonal-shaped pyramid;

wherein the center panel is octagonally shaped along a flat plane and the reflector hood comprises: two pairs of side panels attached to and downwardly depending from the radially outermost portion of the center panel, each side panel being diametrically opposed to another side panel; and two pairs of corner panels attached to and downwardly depending from the radially outermost portion of the center panel, each corner panel being diametrically opposed to another corner panel;

so that a plurality of flutes are formed at the intersections of side and corner panels, the flutes reflecting radiation emitted from a bulb positioned at the focal point of the reflector hood perpendicularly downwardly from the flat plane of the center panel.

2. The horticulture lighting system of claim 1 wherein the dimensions of the side, corner and center panels are selected to form an square-shaped lighted area of 4×4 ft, 6×6 ft or 8×8 ft when the reflector hood is mounted at a distance at least seven feet above ground and when a light bulb is placed at the focal point of the hood, the square-shaped area of lighting area having a flux density with uniformity not in excess of a 1.5 to 1.0 ratio for the maximum to the minimum radiation value measured within the lighted area.

3. The horticulture lighting system of claim 1 wherein the corner panels have an upper central portion attached to the center panel at an angle of about 40° below the horizontal plane defined by the central panel, a lower central portion bent downwards at an approximate 60° angle below the horizontal plane defined by the upper central portion, and two edge flap sections bent downwards at an approximate 40° angle below the horizontal plane defined by the lower central portion.

4. The horticulture lighting system of claim 1 wherein the side panels have an upper central portion attached to the center panel at an angle of about 40° below the horizontal plane defined by central panel, a middle portion bent downwards so that the middle portion of the side panel produces an approximate 20° angle below a horizontal plane defined by an upper central portion, and a lowermost portion bent at an approximate 40° angle below the horizontal plane defined by middle portion.

5. The horticulture lighting system of claim 1 wherein the corner panels have an upper central portion attached to the center panel at an angle of about 40° below the horizontal plane defined by the central panel, a lower central portion bent downwards at an approximate 60° angle below the horizontal plane defined by the upper central portion, and two edge flap sections bent downwards at an approximate 40° angle below the horizontal plane defined by the lower central portion, and wherein the side panels have an upper central portion attached to the center panel at an angle of about 40° below the horizontal plane defined by central panel, a middle portion bent downwards so that the middle portion of the side panel produces an approximate 20° angle below a horizontal plane defined by an upper central portion, and a lowermost portion bent at an approximate 40° angle below the horizontal plane defined by middle portion.

6. The horticulture lighting system of claim 1 wherein the plurality of flutes formed at the intersections of side and corner panels are formed in a lowermost portion of the four side panels and in a lower central portion of the four corner panels.

7. The horticulture lighting system of claim 2 wherein the light bulb has a metal halide source of radiation energy in the range between 250 and 1000 watts.

8. The horticulture lighting system of claim 2 wherein the light bulb has a high pressure sodium source of radiation energy in the range between 250 and 1000 watts.

9. A horticulture lighting system for providing a uniform field of radiant energy, the system comprising:

a reflector hood having a focal point enclosed by side, corner and center reflective panels attached together to form an octagonal-shaped pyramid;

wherein the center panel is octagonally shaped along a flat plane and the reflector hood comprises: two pairs of side panels attached to and downwardly depending from the radially outermost portion of the center panel, each side panel being diametrically opposed to another side panel; and two pairs of corner panels attached to and downwardly depending from the radially outermost portion of the center panel, each corner panel being diametrically opposed to another corner panel, so that a plurality of flutes are formed at the intersections of side and corner panels, the flutes reflecting radiation emitted from a light bulb positioned at the focal point of the reflector hood perpendicularly downwardly from the flat plane of the center panel;

a socket bracket housing having three pairs of bracket mounting holes formed therein; and, a light bulb socket assembly mounted by means of said socket bracket housing to a side panel of the reflector hood, the socket assembly adapted to hold a single light bulb having an arc for electrically producing radiant energy, wherein the socket assembly has three socket mounting holes formed therein, the socket mounting holes being adapted for mounting the socket assembly within the socket bracket housing using any of the three pairs of bracket mounting holes, so that the arc of different light bulbs mounted within the light bulb socket assembly can be positioned at the focal point of the reflector hood.

10. The horticulture lighting system of claim 9 wherein the plurality of flutes formed at the intersections of side and corner panels are formed in a lowermost portion of the four side panels and in a lower central portion of the four corner panels.

11. The horticulture lighting system of claim 9 wherein the dimensions of the side, corner and center panels are selected to form an square-shaped lighted area of 4×4 ft, 6×6 ft or 8×8 ft when the reflector hood is mounted at a distance at least seven feet above ground and when a light bulb is placed at the focal point of the hood, the square-shaped area of lighting area having a flux density with uniformity not in excess of a 1.5 to 1.0 ratio for the maximum to the minimum radiation value measured within the lighted area.

12. The horticulture lighting system of claim 9 wherein the corner panels have an upper central portion attached to the center panel at an angle of about 40° below the horizontal plane defined by central panel, an lower central portion bent downwards at an approximate 60° angle below the horizontal plane defined by the upper central portion, and edge flap sections bent downwards at an approximate 40° angle below the horizontal plane defined by lower central portion.

13. The horticulture lighting system of claim 9 wherein the side panels have an upper central portion attached to the center panel at an angle of about 40° below the horizontal plane defined by central panel, a middle portion bent downwards so that the middle portion of the side panel produces an approximate 20° angle below a horizontal plane defined by an upper central portion, and side lowermost portions bent at an approximate 40° angle below the horizontal plane defined by middle portion.

* * * * *